(12) United States Patent
Moore et al.

(10) Patent No.: US 9,233,399 B2
(45) Date of Patent: Jan. 12, 2016

(54) DOCUMENT SEPARATION BY DOCUMENT SEQUENCE RECONSTRUCTION BASED ON INFORMATION CAPTURE

(75) Inventors: John A. Moore, Webster, NY (US); Francois Ragnet, Venon (FR); Eric Cheminot, Meylan (FR); Yves Hoppenot, Notre-Dame-de-Mésage (FR)

(73) Assignee: XEROX CORPORATION, Norwalk, CT (US)

( * ) Notice: Subject to any disclaimer, the term of this patent is extended or adjusted under 35 U.S.C. 154(b) by 1305 days.

(21) Appl. No.: 12/951,181

(22) Filed: Nov. 22, 2010

(65) Prior Publication Data

US 2012/0127540 A1    May 24, 2012

(51) Int. Cl.
| | | |
|---|---|---|
| H04N 1/04 | (2006.01) | |
| B07C 3/14 | (2006.01) | |
| H04N 1/32 | (2006.01) | |
| G03G 15/00 | (2006.01) | |
| H04N 1/00 | (2006.01) | |

(52) U.S. Cl.
CPC .............. *B07C 3/14* (2013.01); *H04N 1/00957* (2013.01); *H04N 1/32112* (2013.01); *H04N 1/00127* (2013.01); *H04N 1/00336* (2013.01); *H04N 2201/0081* (2013.01); *H04N 2201/3226* (2013.01)

(58) Field of Classification Search
None
See application file for complete search history.

(56) References Cited

U.S. PATENT DOCUMENTS

| | | | |
|---|---|---|---|
| 5,819,666 A * | 10/1998 | Ishikawa et al. | 101/483 |
| 6,961,449 B2 | 11/2005 | Mil'shtein et al. | |
| 7,617,195 B2 | 11/2009 | Liang et al. | |
| 8,493,609 B2 * | 7/2013 | Truong | 358/1.18 |
| 2004/0036914 A1 * | 2/2004 | Kropf et al. | 358/1.18 |
| 2005/0022122 A1 * | 1/2005 | Barrus et al. | 715/530 |
| 2005/0105145 A1 * | 5/2005 | Yoo et al. | 358/498 |
| 2005/0185220 A1 * | 8/2005 | Martinez | 358/1.18 |
| 2006/0136450 A1 * | 6/2006 | Barrus et al. | 707/101 |
| 2006/0215920 A1 | 9/2006 | Yokose | |
| 2006/0272283 A1 * | 12/2006 | Kawanishi et al. | 53/51 |
| 2007/0005356 A1 | 1/2007 | Perronnin | |
| 2007/0258648 A1 | 11/2007 | Perronnin | |
| 2008/0003034 A1 * | 1/2008 | Ihara | 400/62 |
| 2008/0069456 A1 | 3/2008 | Perronnin | |
| 2009/0060335 A1 | 3/2009 | Rodriguez-Serrano et al. | |
| 2009/0144033 A1 | 6/2009 | Liu et al. | |
| 2009/0324026 A1 | 12/2009 | Kletter | |

(Continued)

OTHER PUBLICATIONS

Csurka, et al., "Visual Categorization with Bags of Keypoints," ECCV *Workshop on Statistical Learning in Computer Vision*, 2004.

(Continued)

*Primary Examiner* — King Poon
*Assistant Examiner* — Pawandeep Dhingra
(74) *Attorney, Agent, or Firm* — Fay Sharpe LLP

(57) ABSTRACT

A system and method for generating separations between jobs in a batch of scanned pages are provided. The method includes, for each of a set of jobs, capturing an image of a representative page of the job. Thereafter, the method includes scanning the set of jobs as a batch to generate a set of scanned pages. The captured images are compared with scanned pages in the set of scanned pages to identify, for at least one captured image, a respective scanned page which matches the captured image. At least one separator is generated for separating the set of scanned pages based on a location of the matching scanned page(s).

24 Claims, 6 Drawing Sheets

(56) References Cited

U.S. PATENT DOCUMENTS

| | | | |
|---|---|---|---|
| 2009/0324087 A1 | 12/2009 | Kletter | |
| 2009/0324100 A1* | 12/2009 | Kletter et al. | 382/217 |
| 2010/0008581 A1 | 1/2010 | Bressan | |
| 2010/0033774 A1* | 2/2010 | Ridl et al. | 358/498 |
| 2010/0046043 A1* | 2/2010 | Huang | 358/474 |
| 2010/0092084 A1 | 4/2010 | Perronnin et al. | |
| 2010/0098343 A1 | 4/2010 | Perronnin et al. | |
| 2010/0134851 A1* | 6/2010 | Ebitani et al. | 358/474 |
| 2010/0185615 A1 | 7/2010 | Monga | |
| 2012/0127540 A1* | 5/2012 | Moore et al. | 358/474 |

OTHER PUBLICATIONS

Perronnin, et al., "Fisher kernels on visual vocabularies for image categorization," in CVPR, 2007.

Perronnin, et al., "Large-scale image categorization with explicit data embedding," in CVPR 2010.

Perronnin, et al., "Large-scale image retrieval with compressed fisher vectors," in CVPR 2010.

U.S. Appl. No. 12/702,897, filed Feb. 9, 2010, Ragnet et al.

U.S. Appl. No. 12/782,105, filed Aug. 31, 2010, Mensink et al.

* cited by examiner

DOCUMENT SEPARATION BY DOCUMENT SEQUENCE RECONSTRUCTION BASED ON INFORMATION CAPTURE

CROSS REFERENCE TO RELATED PATENTS AND APPLICATIONS

The following copending application, the disclosure of which is incorporated herein in its entirety by reference, is mentioned:

U.S. application Ser. No. 12/702,897, filed Feb. 9, 2010, entitled METHOD FOR ONE-STEP DOCUMENT CATEGORIZATION AND SEPARATION, by Francois Ragnet, John A. Moore, Nicholas Saubat, Eric Cheminot, and Thierry Lehoux.

BACKGROUND

The exemplary embodiment relates to document processing. It finds particular application in connection with a system and method for preparing batches of hardcopy documents for scanning, which facilitates separation of the documents, once scanned.

Mailrooms of large organizations, such as corporations, government entities, and the like, receive large quantities of mail which has to be opened and the documents removed and then scanned before further processing. Document preparation is one of the most labor-intensive and therefore expensive steps in most digital mailrooms. To improve throughput, documents may be scanned in batches. Typically, as mail is opened, a preparation operator inserts a slip sheet between each hardcopy document, or each group of documents from the same envelope or folder, prior to scanning, so that scanning can be performed efficiently in large batches. Later in the workflow, these slip sheets are automatically detected and the documents separated. The slip sheets may be printed with barcodes. The cost of printing the slip sheets, and the time involved in inserting them in the document stack, adds considerably to the cost of document processing.

The exemplary embodiment provides a system and method for document processing which avoids the need for slip sheets.

BRIEF DESCRIPTION

In accordance with one aspect of the exemplary embodiment, a method for generating separations between jobs in a batch of scanned pages includes for each of a set of jobs, capturing an image of a representative page of the job. Thereafter, the method includes scanning the set of jobs as a batch to generate a set of scanned pages. The captured images are compared with scanned pages in the set of scanned pages to identify, for at least one (or each) captured image, a scanned page which matches the captured image. At least one separator is generated for separating the set of scanned pages based on location(s) of the matching scanned page(s). One or both of the comparing and the separator generation may be implemented with a computer processor.

In accordance with another aspect, a system for generating separations between jobs in a batch of scanned pages includes memory which, for each of a set of jobs, stores a captured image of a representative page of the job. Memory also stores a set of scanned pages formed by scanning the set of jobs as a batch. Instructions are stored in memory for comparing the captured images with scanned pages in the set of scanned pages to identify, for each captured image, a scanned page which matches the captured image. Instructions are provided for generating at least one separator for separating the set of scanned pages into jobs, based on locations of the matching scanned pages. A processor executes the instructions.

In accordance with another aspect, a method for preparing documents for scanning as a batch includes detecting at least one of a) placement of an envelope on an envelope stack, and b) placement of a hardcopy document removed from the envelope on a jobs stack. In response to the detecting, the method includes capturing an image of the jobs stack. The method further includes repeating the detecting and capturing until a maximum size of the jobs stack is detected, whereby when the jobs stack is subsequently scanned as a batch, individual jobs are detectable based on the captured images.

DETAILED DESCRIPTION

Aspects of the exemplary embodiment relate to a method and a system which facilitate job separation, in particular, the separation of images from scanned batches of hardcopy documents. The method is described in the context of a digital mailroom where the documents may be the contents of envelopes received by the mailroom. However, it is contemplated that the method may be applied to other documents which are converted to digital format in bulk.

The exemplary method and system for job separation do not require the use of a slip-sheet. Rather, by capturing an image of a respective page of each document before the document is batch scanned, the appropriate separations in the scanned batch can be identified by comparing the captured images with scanned pages of the batch, in sequence. When a match is found, indicating the probable starting page of a next document, a separator is generated which is located before the matching scanned page. To actuate the image capture, a weighing machine, such as a digital scale may be provided which is used to detect when a new document has been added to the stack of hardcopy documents.

A "document" is used herein to mean an electronic (e.g., digital) or hardcopy (e.g., paper, plastic, or other flexible media in physical form) recording of information. In its electronic form, a document includes image data. Image data may include text, graphics, or bitmaps. A document image may be in any suitable format, such as TIFF, JPEG, PDF, or the like. If appropriate, the document image may be converted to another format for processing. A "batch" of documents comprises a plurality of documents which, in the case of hardcopy documents, may be without any separators. A "job" generally refers to a document (or in some cases, documents) being processed.

Figure 1:
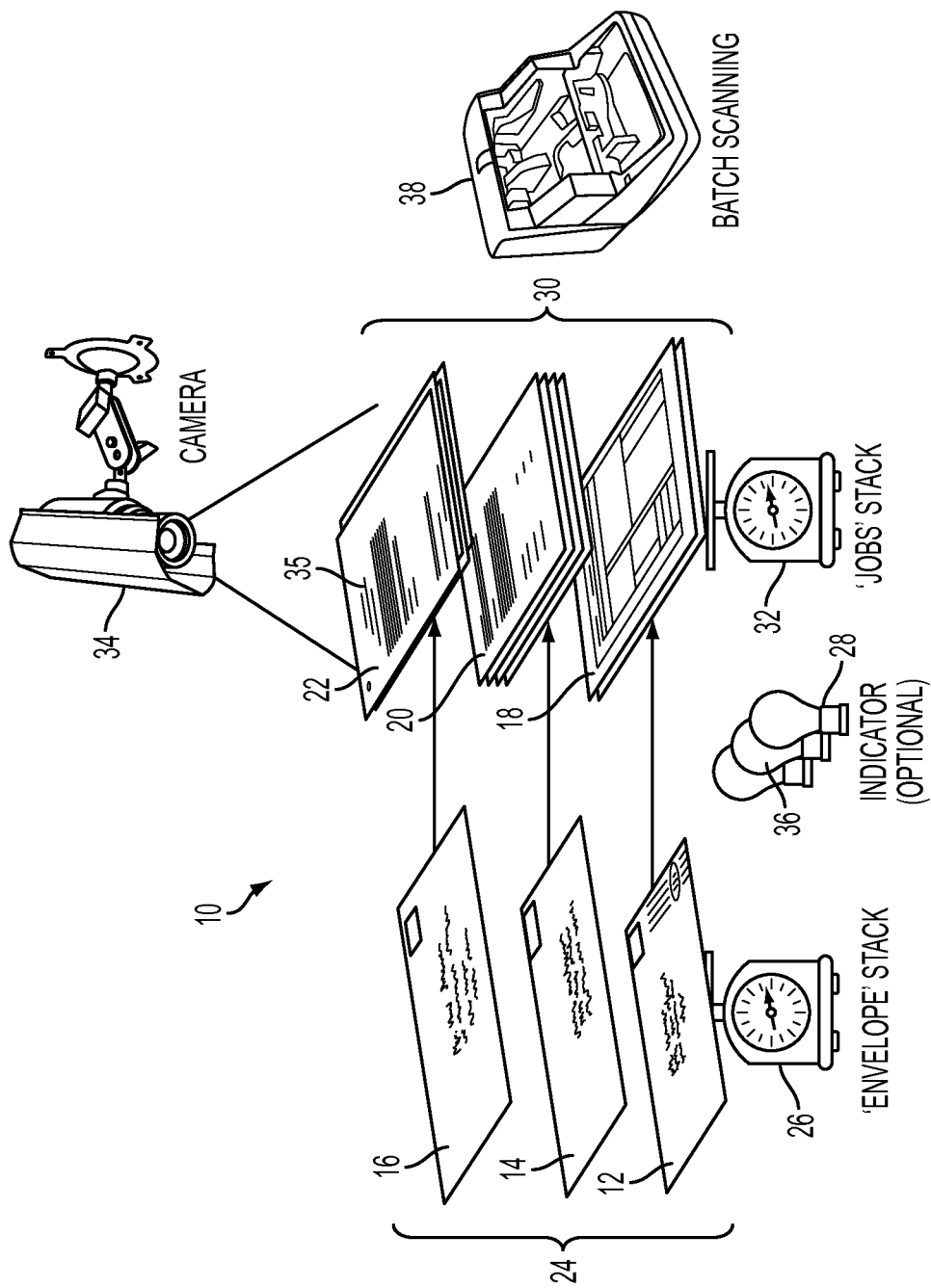
FIG. 1 is an illustration of an overview of part of a system and method for job separation in accordance with one aspect of the exemplary embodiment.

FIG. 1 graphically illustrates a first stage of a method and system 10 for document preparation and separation. Briefly, in the illustrated modified mailroom preparation process, users simply open envelopes and separate them from their content. The envelopes may be placed on one stack, followed by the contents on another stack. As the user works, he or she can optionally be given simple cues (e.g., an indicator light) to indicate when it is time to get a new envelope, place pieces on their corresponding stack, and complete a batch.

When envelopes 12, 14, 16 are opened, they are separated from their content (hardcopy documents 18, 20, 22, respectively) and may be placed on a stack 24 of such envelopes that is being actively weighed (e.g., by a first weighing machine, such as a digital scale 26). When a new envelope 16 is detected (e.g., by detecting that a differential weight threshold for the first scale is exceeded) the system 10 may actuate a first user signaling device (such as lamp 28, vibrator, sound generator, or the like). The system then waits for the user to place the contents 22 face-up on a separate stack, referred to as a jobs stack 30. The jobs stack is also being actively weighed (e.g., by a second weighing machine, such as a digital scale 32, which may be the same or separate from the first scale 26). In the jobs stack 30, the documents are placed one on top of each other in a sequence, the sequence corresponding to the order in which they are removed from the envelopes 12, 14, 16. The top-most job 22 in the stack 30 is thus the latest document to have been removed from its envelope. An image capture device 34, such as a camera, is positioned vertically above the document stack 30 and scale 32 to capture an image of the current top page 35 of the stack 30, which is typically the front page of the top document 22. When a new job is detected (e.g., by detecting that a differential weight threshold for the second scale 32 is exceeded), a picture of the top page 35 of the document 22 is taken by camera 34 and a document counter may be incremented. The camera 34 may be a video camera or a still camera, which captures digital images in color or in monochrome.

Once a large enough number of envelopes 12, 14, 16 has been opened the entire document stack 30 is scanned as a single batch on a production scanner 38. The maximum batch size may alternatively be detected when the jobs stack 30 reaches a predetermined weight, which may be signaled by a second signaling device, such as lamp 36, vibrator, sound generator, or the like. In a second stage of the process, not illustrated in FIG. 1, the resulting scanned images are compared to the reference top-page images captured in the first stage of the process, and when a match is found, a job separation action is triggered.

The threshold weight differences (i.e., the minimum weight change considered to correspond to an envelope or document) for the two scales 26, 32 are set to avoid detection of items with less weight than the smallest envelope or document, respectively, which is typically encountered, such as a threshold weight of about 0.1 gram or less. This avoids the detection of puffs of wind, dust, and other small items which may fall onto the respective stack 24, 30.

As will be appreciated, particularly in the case of mail as jobs, each document 18, 20, 22, removed from its respective envelope may have any number of pages, e.g., from 1 to 100 pages or more, depending on the size of the envelope and paper used, type of business, etc. In the case of a stack containing N documents and p pages, a given document can include from 1 to a maximum of p−(N−1) pages. In the exemplary embodiment, in any scanned batch of documents, some of the documents will have a plurality of pages and for these documents, fewer than all these pages are captured by the camera. In the exemplary embodiment, only one representative page 35, such as the top page, is captured for each document 18, 20, 22. As will be appreciated, in a batch of N documents, only N−1 separators are needed to separate each document from the next. Thus, where reference is made herein to capturing an image of each document and/or for each opened envelope, it is to be appreciated that one of these capturing steps may be omitted for a batch, such as for the first or last document, depending on the order of scanning.

For each opened envelope, one image of its contents is captured by the camera 34 and stored, although in some embodiments, described below, more than one image may be captured and stored where the envelope contains more than one job, which may be referred to herein as sub-jobs. In this case, one image may be captured for each sub-job. A sub-job may occur when an operator determines that an envelope contains more than one document, which should be separated by a separator, and that there are thus two or more sub-jobs. For example, an envelope may include a typed letter and a filled-in preprinted form. These two items may be processed differently after scanning, and thus it is helpful to provide a separator to distinguish between them.

Figure 2:
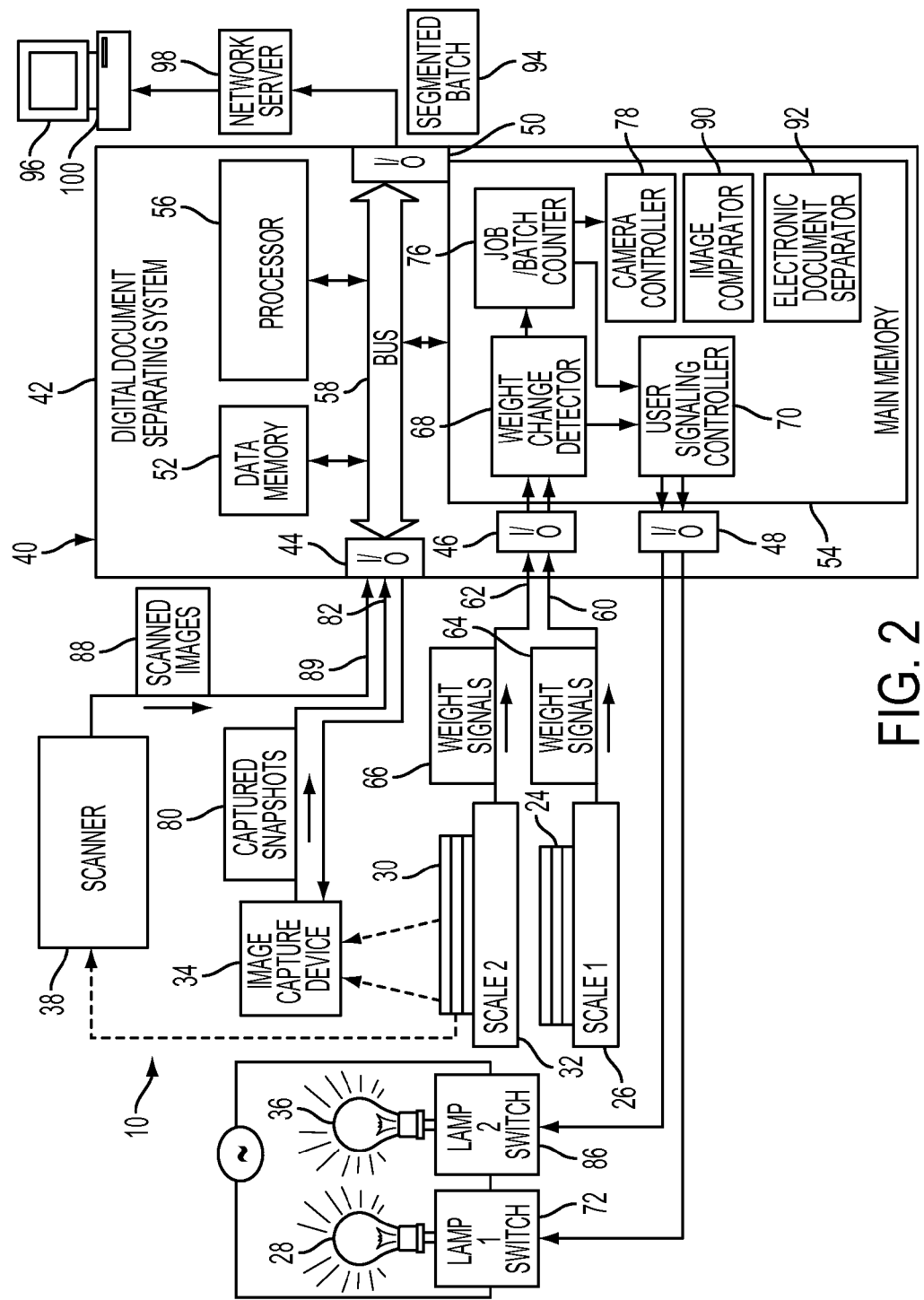
FIG. 2 is a functional block diagram of the system of FIG. 1 in accordance with another aspect of the exemplary embodiment.

FIG. 2 illustrates one embodiment of the exemplary system 10, which includes a computing device 40 hosting a system 42 for digital document separation. The illustrated computing device 40 includes one or more inputs/outputs 44, 46, 48, 50 for communicating with external devices, data memory 52, main memory 54, and a digital processor 56, all connected by a data/control bus (or buses) 58. Computing device 40 may be take the form of one or more computing devices, such as a general purpose computer or dedicated computing device, such as a desktop or laptop computer, PDA, web-based server, network server, combination thereof, or the like. The exemplary processor 56 controls the overall operation of the computing device 40 by execution of processing instructions which are stored in the main memory 54 communicatively connected to the processor. Separation system 42 may be in the form of hardware or a combination of hardware and software. In the exemplary embodiment, memory 54 stores at least a part of the separation system 42 as software instructions which are executed by processor 56.

The memory 52, 54 can include random access memory (RAM), read-only memory (ROM), a hard disk, optical disk, combinations thereof, and the like, and may be physically located in the same computing device or parts thereof may be accessible to the computing device 40, e.g., via a local area network or the Internet.

The digital processor 56 can be variously embodied, such as by a single-core processor, a dual-core processor (or more generally by a multiple-core processor), a digital processor and cooperating math coprocessor, a digital controller, or the like.

Scales 26 and 32 are communicatively linked to the system 42 by one or more wired or wireless links 60, 62 for communicating signals 64, 66 representative of the addition of envelope or document to the respective scale. System 42 includes a weight change detector 68 which receives the signals 64, 66 and outputs a signal if a weight above a threshold is detected. The current weight of each stack 24, 30 may also be stored in memory 52. In the case of signals from the first scale 26, the output of the weight change detector 68 may be received by a user signaling controller 70 which actuates a switch 72 for lamp 28. In the case of signals indicating a threshold weight change from the second scale 32, the weight change detector may signal to a job/batch counter 76 and/or a camera controller 78. The camera controller actuates the camera 34 to capture an image 80 of the top sheet 35 (i.e., the exposed sheet) of the topmost document 22 of the stack 30. The image 80 (or an image signature generated therefrom) is received by the system 42 via a wired or wireless link 82 and stored in memory 52. The image 80 is optionally tagged with a tag corresponding to the document number output by job/batch counter 76.

The job/batch counter 76 compares the current job count to a predetermined maximum number and when the maximum number is reached, signals the signaling controller 70, which actuates a switch 86 for the lamp 36. This tells the operator that the maximum job size is reached. Alternatively or additionally, the weight change detector may detect that a maximum weight has been reached and signal the signaling controller 70, which actuates the switch 86. The user removes the batch of hardcopy documents, which is detected by the weight change detector, and the weight change is reset to zero. The job count is also reset to zero and the batch number incremented by one by the counter 76. The batch of documents is taken by the user from the scale 32 to the optical scanner 38, which scans each page and sends a set of scanned images 88 to the system via a wired or wireless link 89. The file of scanned images may be stored in memory 52, optionally tagged with a batch number output by the job/batch counter.

In some embodiments, one or both of the scales 26, 32 may be omitted, as described in greater detail below, in which case, the weight change detector 68 may also be omitted.

The system 42 also includes an image comparator 90 which compares the images 80 with the scanned page images 88 to determine whether there is a match. When a match is found, a separator is automatically generated by an electronic document separator 92 to separate the last page of one document from the first page of the next. The thus-separated electronic documents 94 may be output by the system 42, e.g., to a data storage device, or to a display screen 96. For example the batch of separated (segmented) document pages 94 may be sent to a network server 98 for delivery to a networked computer 100 operated by a document processing person who view the documents on the screen 96.

In one embodiment, computing device 40 forms a part of the scanner 38, which, in turn, may form part of a multifunction device (MFD) having scanning, copying and optionally printing and/or other capabilities. In this embodiment, the computer 40 may be the MFD's digital front end and may also control functions of the MFD, such as printing, copying, and scanning. In a typical optical scanner 38, a document sheet, such as a page of an original paper form 18, is illuminated with light from a light source and the light reflected from the document sheet is recorded by a photosensitive device such as a CCD (charge coupled device) or CMOS (complementary metal oxide semiconductor) array, to be converted to digital image data. In one embodiment, a narrow strip of the document sheet is illuminated as the sheet is moved through a document handler, or the photosensitive device is moved relative to a platen on which the document sheet is placed. The scanner captures images of all pages of the documents in the stack, whereas the camera only captures an image of a single representative page of each document, such as the first (or last) sheet. Thus, in the case where documents have multiple pages, there are typically a large number of pages in each batch for which no image is captured by camera 34.

The term "software" as used herein is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Figure 3:
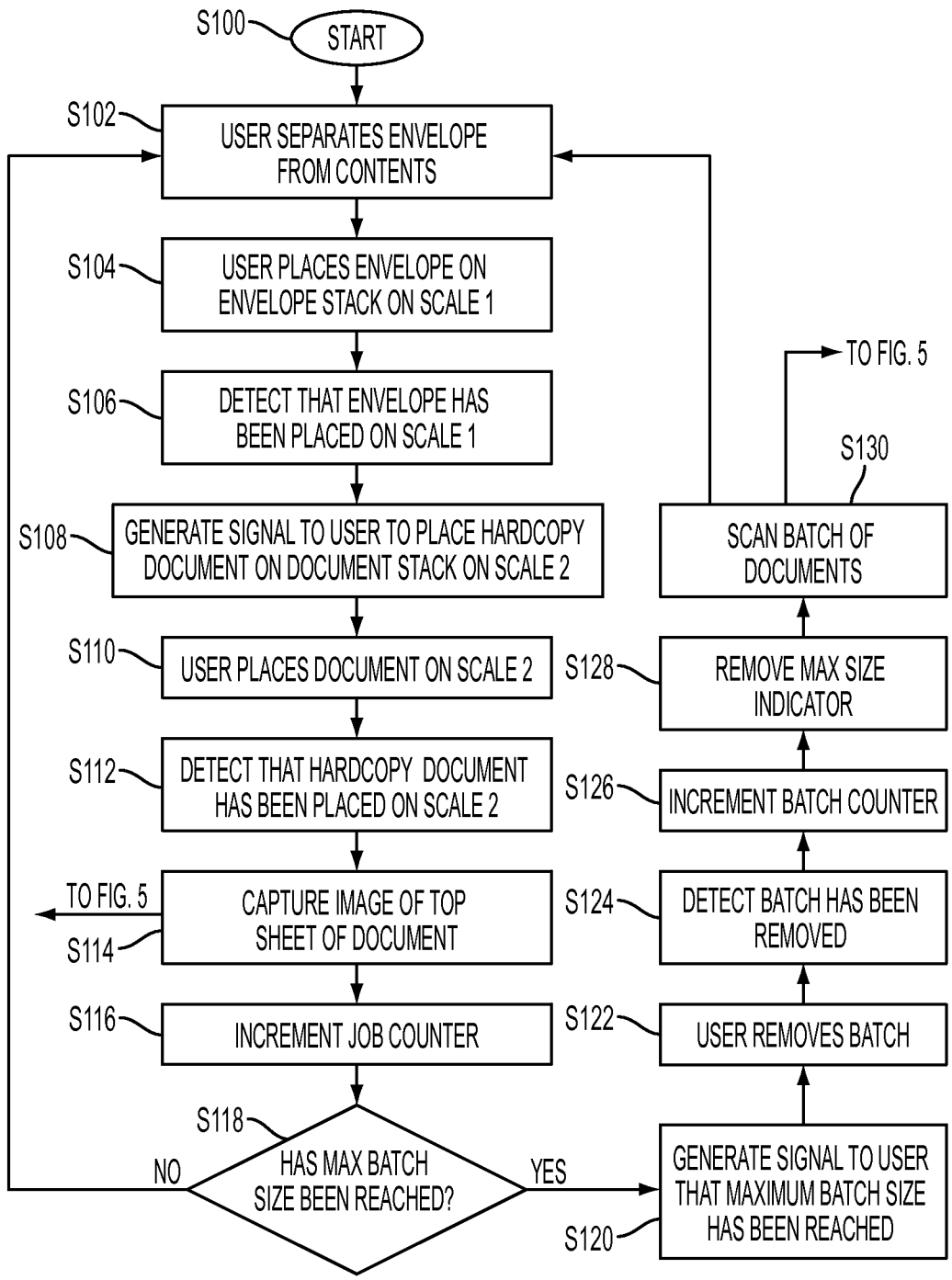
FIG. 3 is a flow diagram illustrating a first part of a method for job separation in accordance with another aspect of the exemplary embodiment.
Figure 4:
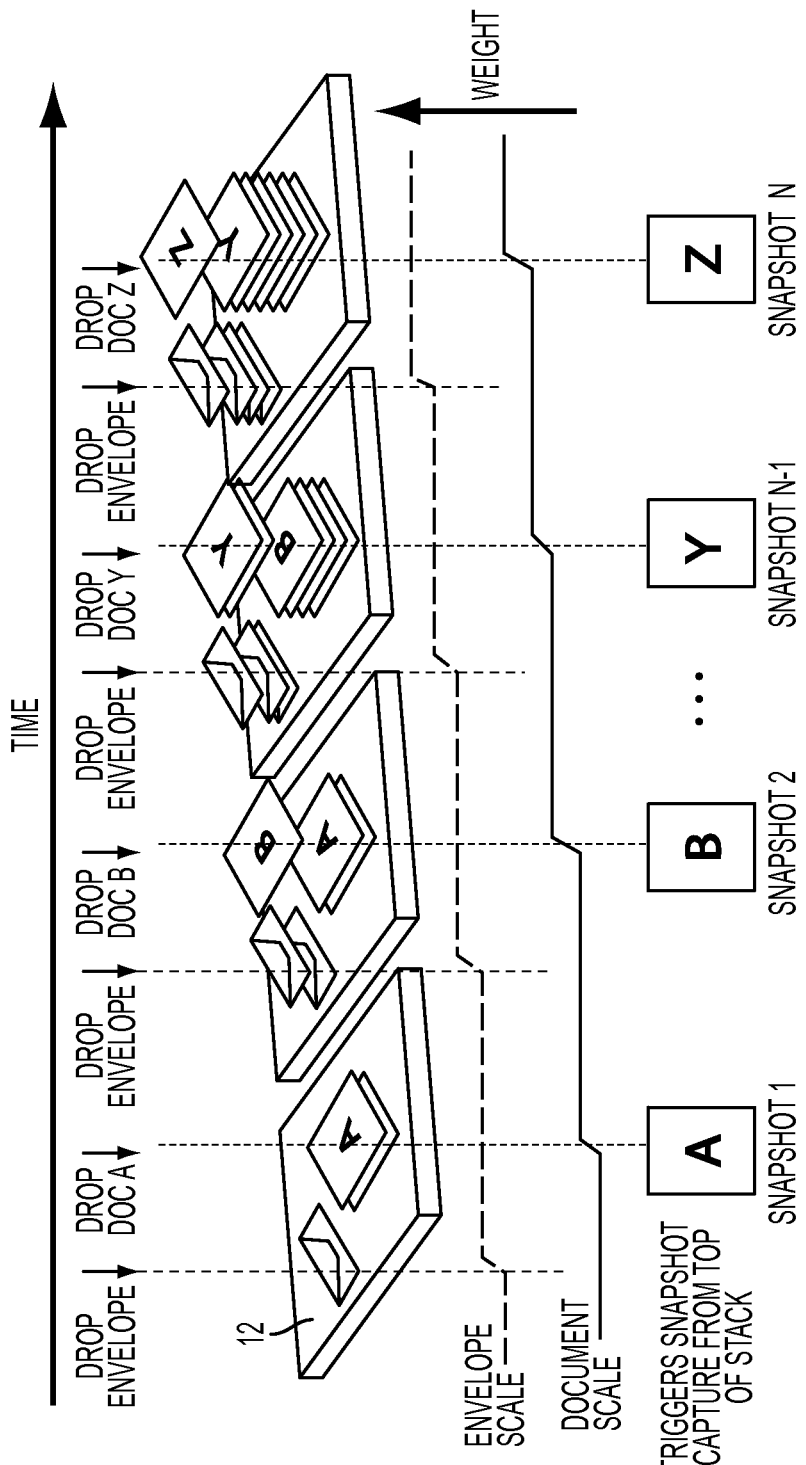
FIG. 4 graphically illustrates the first part of the method shown in FIG. 3 in accordance with one aspect of the exemplary embodiment.

FIG. 3 illustrates a first stage of the exemplary method. A timeline for a set of envelopes is shown in FIG. 4. The method begins at S100. A collection of envelopes to be processed is provided.

At S102, a first envelope 12 (or other suitable job container) is separated from its contents 18.

At S104, the envelope 12 is placed on the envelope stack 24 (which initially, may have no envelopes on it).

If at S106, the envelope stack weight exceeds a configurable threshold, a differential weight of the envelope stack 24 is recorded, e.g., by detector 68. In this way, the placement of the envelope on the first scale 26 is detected.

At S108, the user may be signaled to place the contents 18 of the envelope 12 on the second scale 32. In the exemplary embodiment, the signaling may include the first indicator lamp 28 turning on, e.g., green.

At S110, the contents 18 are placed on the jobs stack 32 (which initially may be empty).

If at S112, the jobs stack weight exceeds a configurable threshold, a differential weight of the jobs stack 32 is recorded, e.g., by detector 68. In this way, the placement of the hardcopy document 18 on the second scale 30 is detected.

In response to a triggering event, at S114, an image (snapshot) 80 of the top page 35 on the jobs stack is captured, which is the first page of the first document 18. The triggering event can be the detection of the placement of a job on the jobs stack 32 at S112 or the pressing of a button by an operator.

At S116, the job counter is incremented by one, e.g., by job/batch counter 76. The captured document image 80 can be associated in memory 52 with the increase in weight of the jobs stack, detected at S112, corresponding to the net weight of that document 22, or the total stack weight, and the job counter number.

If at S118, a maximum batch size is reached, the method proceeds to S120. Otherwise, if there are more envelopes, the method returns to S102, to be repeated sequentially with additional envelopes 14, 16, and their contents 20, 22. The maximum batch size may be reached when one or both of the stack weight and the job counter exceeds a respective predetermined threshold. These thresholds may be a function of the capabilities of the scanner and/or the typical computation time for matching images in the second phase. For example, if the scanner is capable of scanning 500 pages in a batch, a weight corresponding to less than this, e.g., corresponding to about 450-480 pages may be set as the maximum weight so that the batch size does not exceed 500 pages. Additionally, the maximum number of jobs may be established to reduce the chance of errors in the matching stage. For example, a maximum of 50, 100, or 300 jobs (or any other suitable number) may be set.

At S120, the user may be signaled that the maximum batch size has been reached, i.e., that it is time to remove the batch. For example, a "stack full" indicator, such as a second indicator lamp 36 is turned on, e.g., red, until the batch 30 is removed from the scale 32.

At S122, the jobs stack 30, as a new batch of documents, is removed from the scale 32.

At S124, the removal of the batch 30 is detected by the system 42, based on a decrease in weight on the scale 32.

At S126, the batch counter is incremented by the jobs/batch counter 76. The total number of jobs in the batch and/or its total weight may also be recorded in memory 52.

At S128, the user may be signaled that the next batch of documents can be processed, e.g., second indicator lamp 36 is turned off.

At S130, the batch of documents is scanned on the scanner 38. In the batch scanning, there are no separators between the jobs, i.e., the jobs are concatenated as a single file, e.g., a PDF file, which includes all the scanned pages.

If there are more envelopes, the method returns to step S102 for the generation of the next batch. The empty envelopes of the prior batch are typically no longer needed, and may be removed from the scale and thrown away. Alternatively, the envelope stack may be allowed to build up over the course of several batches of documents before being removed.

The first stage of the method may continue until all envelopes have been processed, or for any convenient number of batches.

While in the exemplary embodiment, steps S102, S110, and S122, may all be performed manually, i.e., by a human operator, it is also contemplated that a robot may be trained for performing some or all of these tasks.

As illustrated in FIG. 4, which illustrates a timeline of events in the first stage of the method, the two scales 26, 32 increase in weight as the envelope and document stacks 24, 30 build up. The capture of the snapshot of the document may be scheduled to take place immediately after the detection of the next document on the scale 32. Or, in other embodiments, there may be a time lapse, to allow for the case where the user has placed fewer than all pages of the document on the scale. The time lapse could be any time up to the detection of the next envelope, or shortly thereafter. In yet another embodiment, the capture of the snapshot of the document may be scheduled when the envelope is dropped, in which case the previous document would be captured instead of the current one.

Once the batch 30 has been scanned, the system 42 may then use a matching algorithm stored in main memory 54 to iteratively compare each scanned image 88 to one of the front-side images 80 captured during the preparation stage. When a match is achieved, the comparator 90 of the system 42 triggers an electronic job separation action, and then looks for the next match. This document separation step is traditionally done by looking for slip-sheets with pre-defined barcodes. In the present method, no slip sheets are needed to do job separation.

Figure 5:
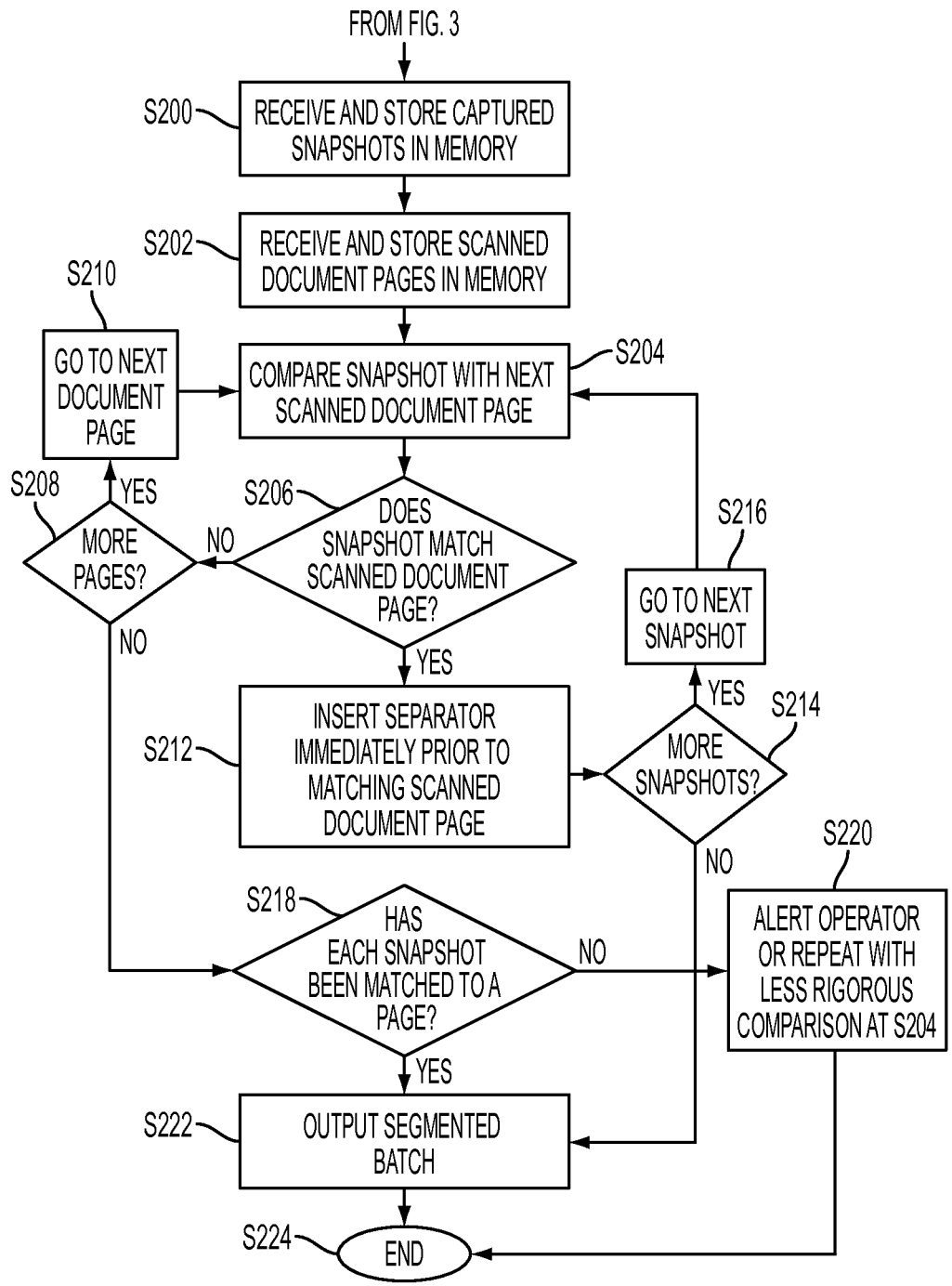
FIG. 5 is a flow diagram illustrating a second part of the method for job separation of FIG. 3 in accordance with another aspect of the exemplary embodiment.

FIG. 5 illustrates this second stage of the method in accordance with an exemplary embodiment.

At S200, snapshots 80 captured at S114 are received by the system 42 and stored in data memory 52 during processing.

At S202 an electronic file, which includes the scanned (digital) document pages 88 for the batch generated by the scanner at S130, is received and stored in data memory 52. At this stage, there is no indication as to where each digital document in the file begins and ends.

At S204, snapshots 80 are compared with scanned pages 88 to identify matching scanned pages. This may be performed sequentially. Specifically, the first snapshot 80 is compared with the first digital document page 88 to see if there is a match. This may include comparing a reduced-information representation extracted from the snapshot 80 with a reduced information representation extracted from the digital document page 88 to see if a threshold level of similarity is exceeded. If not, at S208, the method proceeds to identify the next document page in sequence (S210), if there is one, and returns to S204. If there is a match at S206, then the method proceeds to S212, where a separator is inserted immediately prior to that document page 88 in the file. Each separator can be any information which distinguishes one digital document from another. For example, a separator denotes when one document ends or another begins, or both.

Thereafter, the method proceeds to S214, where, the method proceeds to identify the next snapshot 80 in sequence (S216), if there is one, and returns to S204, where that snapshot 80 is compared with the next scanned document page 88 in sequence, after the matched page, and so forth.

To ensure quality of separation, the expected number of jobs/sub-jobs from the first stage (FIG. 3) can be compared to the detected number of jobs in the scanned batch (e.g., number of matches). An exception can be raised if they do not agree. In one embodiment, if at S208, there are no more pages, then at S218 a check is made to see that each snapshot 80 has been matched with a respective document page 88. If there are unmatched snapshots, then at S220, an operator may be alerted that the batch has not been properly segmented. In some embodiments, before an operator is alerted, the method may be repeated from S204 with a less rigorous similarity requirement for at least the unmatched snapshots.

If at S218, each snapshot 80 has been matched to a page 88, the segmented batch is output at S222. The method ends at S224.

Further details of the exemplary method and suggested modifications are now described.

Various methods may be used for indicating to users which step in the preparation process is next. For example, sounds, vibration, lights, or combination thereof maybe employed.

The placement of an envelope on the envelope stack (S104) and/or the detection of its presence (S106) are optional. The detection of the envelope can serve several uses, however, such as one or more of: establishing the presence of a new job; for computing the number of jobs in the jobs stack (where each envelope is considered to contain a single job); for associating sub-jobs with an overall job; for initiating image capture, for helping to ensuring that the user is instructed to put a document on the jobs stack; and the like.

In one embodiment, in the preparation stage, e.g., at S122, a record of the number of documents in the batch is stored in memory 52 (e.g., output from the job/batch counter 76). Once the processing of the batch is completed, e.g., at S218, the document count captured during the preparation stage may be compared to the number of documents found in the document matching and separation stage. If the numbers disagree, an exception could be triggered.

In another embodiment, e.g., at S122, a record of the collected weight of the stack 30, e.g., immediately prior to its removal, is recorded in memory 52. This information on the document stack weight may be used by the system 42 to estimate roughly the number of pages that the batch contains, e.g., based on a stored approximate page weight. The average number of pages per document could then be computed, using the record of the number of documents in the batch. This information could be used to aid the system in finding matching pages. In one embodiment, the approximate position of the image of the front page of each document is computed from the net weight of the document recorded at S112, the total weight of all documents in the batch, and the total number of pages in the digital file output by the scanner. The system compares this scanned image with the captured image for that document number and if there is no match, iteratively examines the adjacent images sequentially (previous and next images) until a match is found. This method may be particularly suited to documents with a relatively large number of pages but may be less useful when documents typically have three or less pages.

In one embodiment, the system 42 may automatically account for variations in stack-ordering in relation to the scanner used. For example, the production scanner 38 may feed from the top or the bottom of the stack. Additionally or alternatively, the document preparation operator may place the envelope on its stack 24 before the document is placed on its stack 30, or after.

In one embodiment, the system 42 may assume the sequential ordering is preserved to limit the search space for the matching algorithm at S206. In another embodiment, the system may compare all page images 88 in the batch with the captured image 80, without considering the sequence. In yet another embodiment, only if the system does not find a match for a captured image which preserves the sequential ordering, the system may review images out of sequence.

In the exemplary embodiment, the detection of at least a threshold increase in weight by the document scale 32 is used as the trigger for image capture. In another embodiment, the detection of the envelope drop at S106 is used as a trigger for the image capture. For example, when a threshold increase in weight on scale 26 is detected, this may trigger a signal being sent by the scale 26 or system 42 to the camera 34 to capture a snapshot image 80. In this embodiment, the snapshot 80 may be of the prior document, i.e., the top sheet of the document taken from the previous envelope. The operator may be instructed to drop envelopes 12, 14, 16 before or after respective documents 18, 20, 22 in a consistent fashion.

In one embodiment, automated or manual methods may be provided which enable the quality of images 80 captured at S114 to be evaluated and thereby confirmed to be acceptable or not. For example, S114 of the method may include evaluating whether the operators hand, or other page-obscuring object, is in the picture. For this, image processing software may be employed to evaluate whether the captured image includes the operator's hand, and if so, generate a warning to the operator to remove the hand before another image of that page is captured to replace the defective one. In other embodiments, the captured image 80 may be displayed, e.g., on a screen. This allows the user to determine whether a captured image is defective and, if so, the user can request that it be replaced by a new image. The user may make such a request using a user input device, such as a touch screen, keypad, keyboard, cursor control device, or the like, communicatively linked to system 42.

In the exemplary embodiment, each envelope 12, 14, 16 is considered to contain a respective, single document, which is considered as a single job. In other embodiments, a single envelope may contain multiple jobs, referred to herein as sub-jobs. In this embodiment, the system provides for the ability to generate sub-job separators, for example multiple documents per envelope. The operator may drop three sets of pages on the jobs stack, with a short time interval between each, which may be automatically tracked as three documents per envelope (job). The camera 34 captures three separate images 80. In other embodiments, the operator may use a user input device to select the number of sub-jobs for a particular envelope. The system then associates the three sub-jobs with an overall job. In yet other embodiments, the detection of multiple sub-jobs for a single envelope may be automatic. For example, image capture may be performed at regular intervals, rather than in response to a document/envelope drop, and the captured images 80 compared. When two captured images are compared (e.g., using the same type of similarity measures for comparing snapshot images and scanned images, described in further detail below), and determined to be of the same hardcopy document page, one of the images (e.g., the last) is discarded. In this way, a single image of each sub-job is retained, which may be associated to a particular job based on the time at which the envelope was dropped onto its stack. In yet another embodiment, an image 80 may be captured each time there is a threshold weight change on the document stack 30. As with the prior embodiment, each sub-job may be associated with its respective job based on the time of the document drops in relation to the envelope drop times.

While in the exemplary embodiment, envelopes 12, 14, 16 are used as physical indicators of a new job, in other embodiments, e.g., outside of the mailroom context, other physical job containers may be used as job separators. For example, in a file room, the envelopes may be replaced with file folders. In file scanning applications, therefore, the folders serve as the physical job separators rather than envelopes. These folders may be disposed of once the scanning is complete, for example, if the contents are to be stored electronically and not in hardcopy form.

While in the exemplary embodiment, the job trigger is an envelope or document weight, in another embodiment, the weighing may be replaced by a user input signal, e.g., actuation of a push-button could replace S106 and/or S112. While this may eliminate the need for one or both scales 26, 32, and the respective detection step(s), a disadvantage is that it may incur an extra action from the operator, adding to the processing time and potentially causing problems if the operator forgets to input the signal or accidentally inputs a signal twice for the same document 18, 20, 22.

In one embodiment, one or both of the weighing machines 26, 32 may be replaced by continuously taking images 80 of the top of the document stack 30 and then detecting image changes as an indication of a new document/job. For example, a new image may be captured every one to three seconds, during generation of a batch. As will be appreciated, in such a method, one or more of steps S104, S106, S110, and S112 may be omitted. In such an embodiment, if the scale 32 is omitted, then the operator is instructed to position the document stack 30 directly below the camera, e.g., on a designated marked rectangle, so that it can be photographed. The camera in this case may be a video camera. Absence of a page image in the sequence of images taken by the camera may be used as an indicator that the operator has removed the batch. The batch position rectangle may be marked with a glyph which allows the system 42 to detect easily, from examination of the captured images, when there are no documents 18, 20, 22 in the stack 30.

In one embodiment, the user may be provided with cues, e.g., light(s), sound(s), displayed instructions, combinations thereof, or the like) for indicating when the next process step should be performed, e.g., prior to S104 and/or at S108. This embodiment may be used initially, during an operator training phase, then discontinued or modified thereafter.

The method illustrated in FIGS. 3 and/or FIG. 5 (e.g., steps other than steps which are performed manually, such as S104, S110, S122 and optionally S130) may be implemented in a computer program product that may be executed on a computer. The computer program product may include a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in one or both of FIGS. 3 and 5, can be used to implement the exemplary method.

Figure 6:
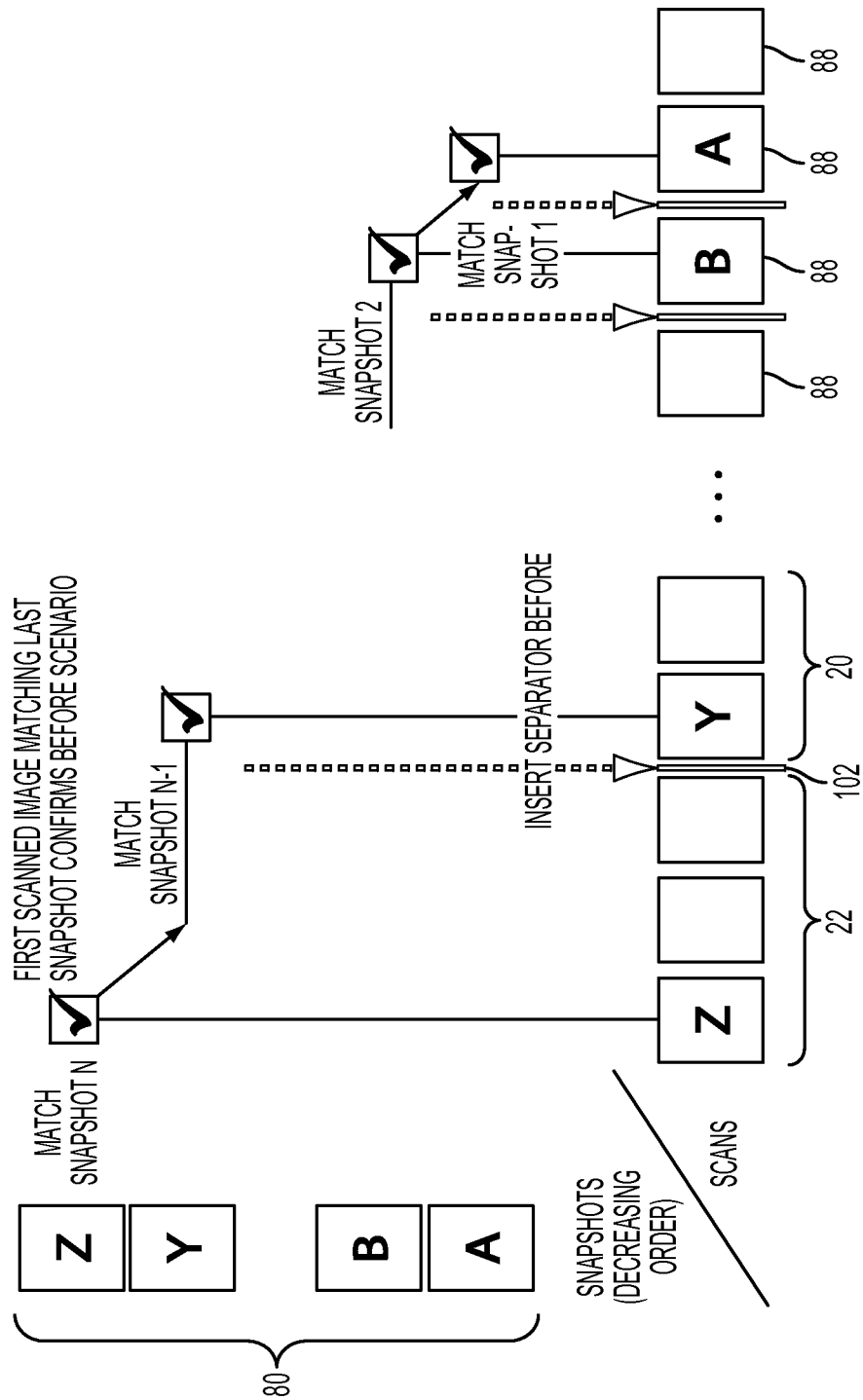
FIG. 6 illustrates aspects of the second part of the method shown in FIG. 5.

FIG. 6 illustrates the insertion of separators 102 using the captured snapshots 80 illustrated in FIG. 4. Since the last document in the stack, corresponding to the last snapshot, appears first in the file output by the exemplary scanner, the snapshot sequence is reordered to match to the order in which the documents appear in the file from the scanner. The first snapshot to be compared is thus snapshot Z, which matches the first page in the scanned file. Since there in no previous page in this instance, a separator is not needed. Although it may not be necessary to match the first snapshot Z and first scanned image, since in theory, they are automatically a match, it may be helpful to perform the first matching step as a check on whether the scanned images need to be rotated or otherwise preprocessed for effective matching and/or to adjust the matching algorithm so that it is less rigorous if a match for this snapshot with the first document page is not found.

The next snapshot to be matched is snapshot Y. When the corresponding scanned page is found, a separator 102 is inserted before that page, to denote the end of the first document 22 and the beginning of the second 20. The method of matching of snapshots to pages and inserting separators continues until all the snapshots have been matched (or there are no more document pages).

Any suitable method for matching images (S206) can be employed. Since the captured images 80 may be in a different format and/or at a different resolution to the scanned images 88, there may be some preprocessing of the captured and/or scanned images to facilitate the comparison. In the case of the scanned page images, common preprocessing tools such as resizing, cropping of (dark) backgrounds, removal of skew, binarizing (to convert grayscale or color images to black and white), and so forth may be used prior to the comparison. Existing techniques, such as correlation, hashing, feature extraction, optical character recognition (OCR), combinations thereof, and the like may be employed for image matching. Accordingly, in one exemplary embodiment, a representation of each image (captured and scanned images) may be computed to reduce computation time during the matching. As will be appreciated, an exact match is not required. A threshold level for a match can be established through experimentation which ensures that when a particular image 88 and a captured snapshot 80 are determined to be a match, there is a high probability that the two images 88, 80 were derived from the same document page.

The use of hash functions for computing similarity between images is described for example, in U.S. Pub. No. 20100185615, the disclosure of which is incorporated herein by reference. In such a method, a hash value is computed for each captured image which can be compared to hash values of scanned images.

Methods for comparing images using correlation functions are described, for example, in U.S. Pat. No. 6,961,449, the disclosure of which is incorporated herein by reference. In such a method, data in each image is compressed into a projection using compression and a correlation function is computed. Correlation methods also are described in U.S. Pub. No. 20060215920, the disclosure of which is incorporated herein by reference. In such a method, the image data is coded, e.g., based on correlation between pixel clusters extracted by an extracting unit. The compressed representations of two images generated by respectively coding them can be used for determining similarity.

Methods for computing similarity between images with feature-based image representations are described for example, in U.S. Pub. Nos. 20070005356, 20070258648, 20080069456, 20090144033, 20100092084, and 20100098343, the disclosures of which are incorporated herein by reference, Gabriela Csurka, et al., "Visual Categorization with Bags of Keypoints," ECCV *Workshop on Statistical Learning in Computer Vision,* 2004; Florent Perronnin, et al., "Fisher kernels on visual vocabularies for image categorization," in CVPR, 2007; Florent Perronnin, et al., "Large-scale image categorization with explicit data embedding," in CVPR 2010; and Florent Perronnin, et al., "Large-scale image retrieval with compressed fisher vectors," in CVPR 2010. In such methods, low level features are extracted from regions of the image and used to generate a features vector, Gaussian mixture model, histogram, or the like, which represents the image.

Methods for matching documents based on identifying keypoints in the respective images and generating fingerprint information therefrom are described, for example, in U.S. Pub. Nos. 20090324100, 20090324087, 20090324026, the disclosures of which are incorporated herein by reference.

Methods for using OCR to compare images may include using an OCR engine to extract text from the images and then generating a representation based on the words identified in the image, for example a histogram of word counts. To take into account that pages of different text lengths are being compared, a normalized representation may be used. Additionally, the words may be lemmatized and stop words with high frequencies may be ignored. For example, a standard language model may determine the relative frequency of words in the page to that of a collection of such pages. The resulting language model may define, for each scanned page or captured image, a probability distribution over the lemmatized words. In this method, a suitable similarity measure between two images which can be computed is the cross-entropy as described, for example, in application Ser. No. 12/872,105, incorporated herein by reference. Another method may include creating a near unique representative string based on the OCRed content of the captured document and searching for this in the scanned images. See, for example, U.S. Pat. No. 7,617,195 to Liang, et al., incorporated herein by reference, for a further description of this technique. For handwritten documents, wordspotting methods, such as those described in U.S. Pub. Nos. 20090060335 and 20100008581, the disclosures of which are incorporated herein by reference, may be used to identify words in the images, from which probability distributions can be computed.

Many of these methods for computing similarity thus involve deriving a (generally compressed) representation of the snapshot image 80 which can be compared with representations derived from the scanned images in the corresponding batch.

The output of the scanner 38 may be a file comprising a set of page images 88. For the insertion of the separators 102, any suitable method or combination of methods can be employed. For example, the separators 102 may be in the form of tags, such as XML tags. In another embodiment, additional digital pages may be inserted between scanned documents. In yet another embodiment, a list of pages where the separators 102 are located can be appended to the scanned file or stored as a separate file (for example, the list or file may indicate that the first document is three pages long, the second is 2 pages, and so forth). In another embodiment, the scanned file output by the scanner may be split into a set of files, or directories, e.g., one per job/document.

One advantage of the exemplary system and method is in cost and time savings by removal of the need for slip-sheets for job/document separation in batch scanning applications.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for generating separations between jobs in a batch of scanned pages without using slip sheets for separating jobs of the batch, comprising: for each of a set of jobs: detecting at least one of: placement of a job container on a stack of job containers; and placement of a job removed from the job container on a jobs stack; and in response to the detecting, capturing an image of a representative page of the job, wherein for each job, the representative page is a top page of the job and the capturing comprises capturing an image of the top page of the job with a camera placed above the jobs stack; thereafter, scanning the set of jobs as a batch to generate a set of scanned pages without scanning slip sheets for separating jobs of the batch; with a processor of a computing device, comparing the captured images with scanned pages in the set of scanned pages to identify, for at least one captured image, a scanned page which matches the captured image; and generating at least one separator for separating the set of scanned pages based on a location of the matching scanned page.

2. The method of claim 1, wherein the jobs comprise hardcopy documents, each document comprising at least one page.

3. The method of claim 2, wherein some of the hardcopy documents each comprise a plurality of pages.

4. The method of claim 1, further comprising providing a signal to a human operator to add a new job in the set to the jobs stack.

5. The method of claim 1, wherein the detecting comprises:
detecting the change in weight of the stack of job containers from which the jobs have been removed; and
wherein the capturing of the image of the representative page of the job is in response to detection of a threshold weight change of the stack of job containers.

6. The method of claim 1, wherein the job containers comprise empty envelopes.

7. The method of claim 1, wherein the detecting comprises detecting:
placement of a job container on a stack of job containers; and
placement of a job removed from the job container on a jobs stack.

8. The method of claim 1, wherein for each job, only a single representative page is captured.

9. The method of claim 1, further comprising:
detecting when a maximum size of the job stack is reached and generating a request that the stack of jobs be scanned as a batch in response to the detection of the maximum size being reached.

10. The method of claim 9, wherein the detecting when a maximum size of the job stack is reached comprises at least one of:
detecting a change in weight of a stack of the jobs; and computing a number of jobs in the stack.

11. The method of claim 1, wherein the comparing of the captured images with scanned pages includes computing a similarity of a first of the captured images with scanned pages in sequence until a first match is found and computing a similarity of a second of the captured images with new scanned pages in sequence until a second match is found.

12. The method of claim 1, wherein the comparing of the captured images with scanned pages includes generating a representation of the captured images and comparing the representations of the captured images to representations of the scanned pages.

13. The method of claim 1, wherein the generation of at least one separator includes inserting a separator before each matching page, unless there are no pages in the set of scanned pages which are before the matching page.

14. A computer program product comprising a non-transitory recording medium encoding instructions, which when executed on a computer causes the computer to perform the method of claim 1.

15. A system comprising non-transitory memory storing instructions for performing the method of claim 1 and a processor in communication with the memory for executing the instructions.

16. A method for generating separations between jobs in a batch of scanned pages without using slip sheets for separating jobs of the batch, comprising: detecting placement of a job on a jobs stack comprising detecting a change in weight of the jobs stack; in response to the detecting, for each of a set of jobs, capturing an image of a single representative page of the job when a threshold weight change of the stack of jobs is detected; thereafter, scanning the set of jobs as a batch to generate a set of scanned pages without scanning slip sheets for separating jobs of the batch; with a processor of a computing device, comparing the captured images with scanned pages in the set of scanned pages to identify, for at least one captured image, a scanned page which matches the captured image; and generating at least one separator for separating the set of scanned pages based on a location of the matching scanned page.

17. The method of claim 16, wherein for each job, the single representative page is a top page of the job and the capturing comprises capturing an image of the top page of the job with a camera placed above the jobs stack.

18. A system for generating separations between jobs in a batch of scanned pages, comprising: memory which, for each of a set of jobs, detects at least one of: placement of a job container on a stack of job containers; and placement of a job removed from the job container on a jobs stack; and stores a captured image of a representative page of the job, the representative page being a top page of the respective print job, the image of the top page being captured while the job is on a lobs stack with a camera placed above the jobs stack; memory which stores a set of scanned pages formed by scanning the set of jobs as a batch; instructions, stored in memory for comparing the captured images with scanned pages in the set of scanned pages to identify, for each captured image, a scanned page which matches the captured image; and instructions for generating at least one separator for separating the set of scanned pages into jobs, based on locations of the matching scanned pages; and a processor for executing the instructions.

19. The system of claim 18, further comprising a first weighing machine on which jobs are stacked prior to scanning and instructions for capturing an image when a threshold weight difference in the stack of jobs is detected.

20. The system of claim 18, further comprising an image capture device which captures the captured images and a scanner which scans the batch of jobs.

21. The system of claim 18, further comprising a camera which captures the image.

22. A method for scanning documents as a batch comprising:
for each of a set of jobs, capturing an image of a representative page of the job comprising:
   detecting at least one of:
      placement of an envelope on an envelope stack; and
      placement of a hardcopy document on a jobs stack; and
   in response to the detecting, with a camera, capturing an image of the jobs stack to capture only a single representative page of the hardcopy document;
repeating the detecting and capturing until a maximum size of the jobs stack is detected;
thereafter, with a scanner, scanning the set of jobs as a batch to generate a set of scanned pages;
with a processor of a computing device, comparing the captured images with scanned pages in the set of scanned pages to identify, for at least one captured image, a scanned page which matches the captured image of the hardcopy document page; and
generating at least one separator for separating the set of scanned pages based on a location of the matching scanned page.

23. The method of claim 22, wherein the detecting includes detecting a change in weight of the stack with a weighing machine.

24. A computer program product comprising a non-transitory recording medium encoding instructions, which when executed on a computer causes the computer to perform the method of claim 22.

* * * * *